July 21, 1959  R. C. McDOWELL  2,895,818
METHOD AND APPARATUS FOR DEEP-BED CHARGING OF TRAVELING GRATES
Filed April 9, 1956  3 Sheets-Sheet 1
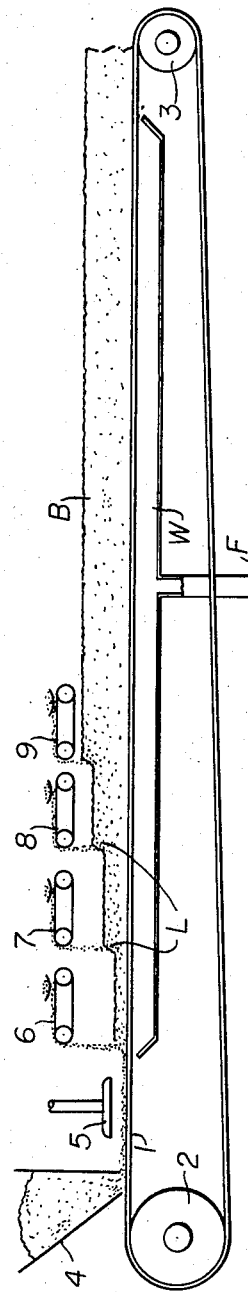
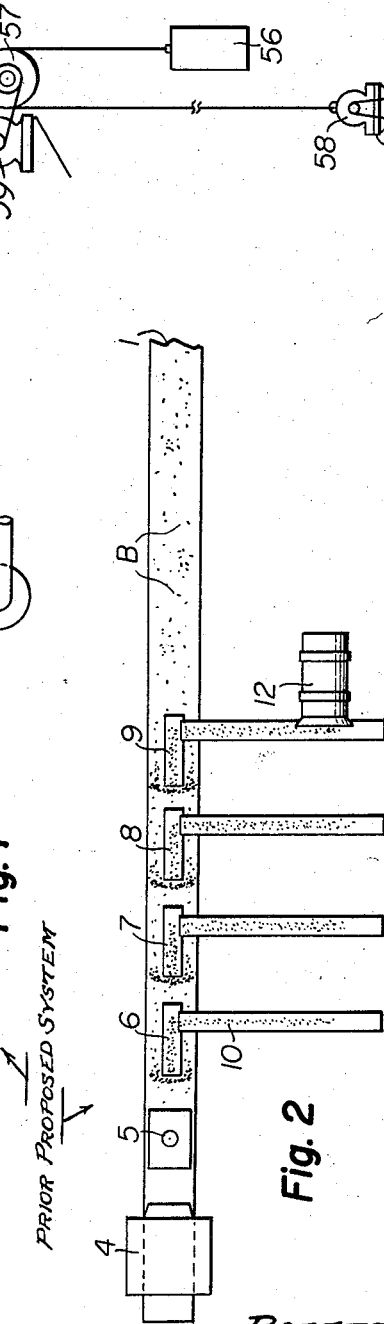
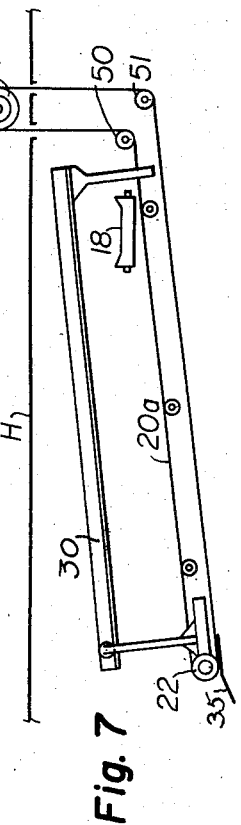
INVENTOR.
ROBERT C. McDOWELL
BY
Justin E. Macklin
ATTY July 21, 1959  R. C. McDOWELL  2,895,818
METHOD AND APPARATUS FOR DEEP-BED CHARGING OF TRAVELING GRATES
Filed April 9, 1956  3 Sheets-Sheet 2

INVENTOR.
ROBERT C. McDOWELL,
BY
Justin W. Macklin,
ATTY

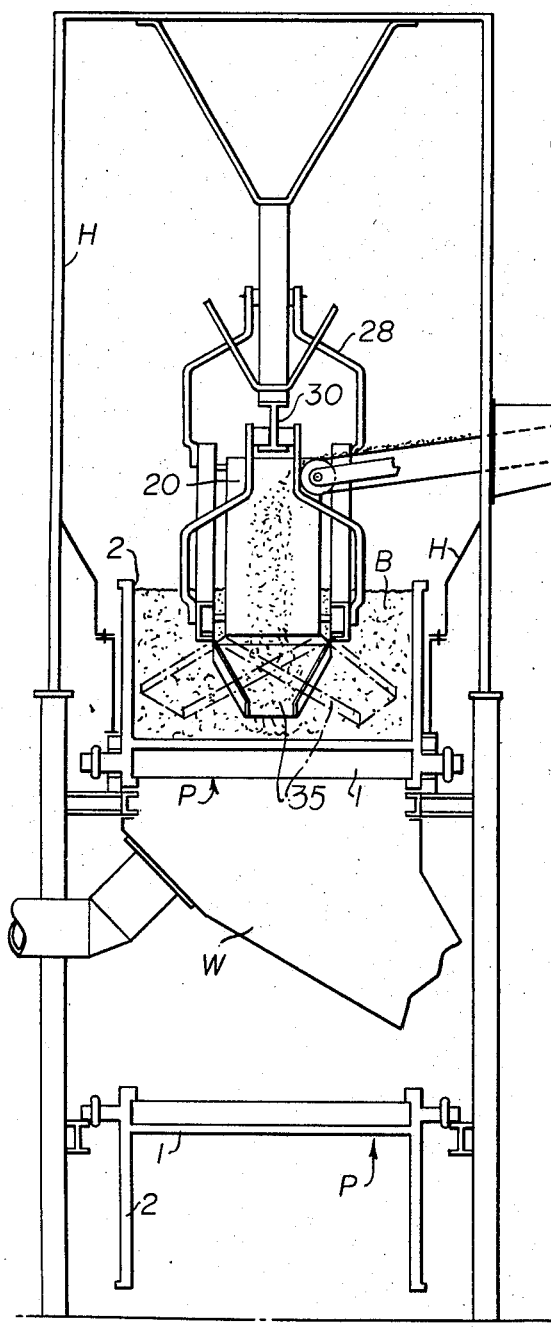
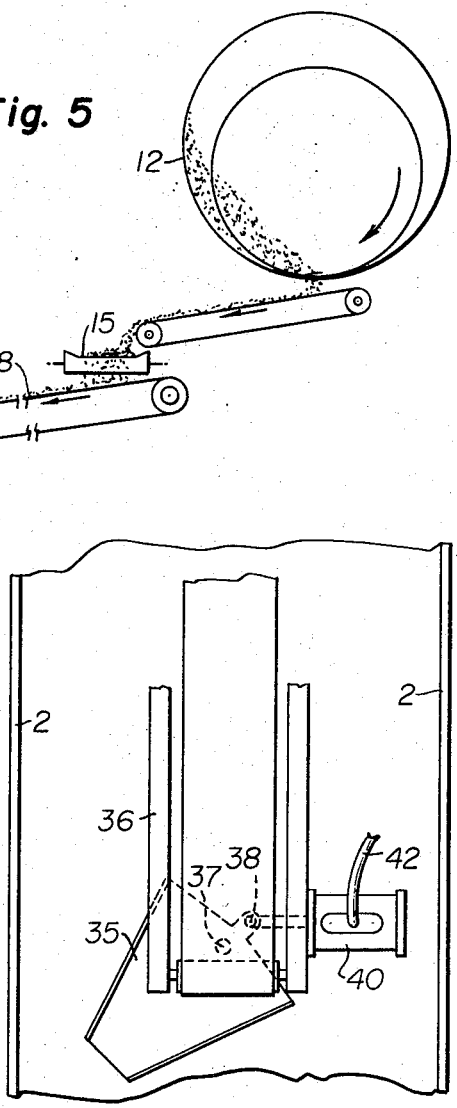
Fig. 5
Fig. 6
INVENTOR.
ROBERT C. McDOWELL,
BY

United States Patent Office 2,895,818
Patented July 21, 1959

2,895,818

METHOD AND APPARATUS FOR DEEP-BED CHARGING OF TRAVELING GRATES

Robert C. McDowell, Lakewood, Ohio, assignor to McDowell Company, Inc., Cleveland, Ohio, a corporation of Ohio Application April 9, 1956, Serial No. 577,137

6 Claims. (Cl. 75—5)

This invention relates to a novel method of applying material to be sintered to the pallets of a traveling grate sintering machine. The present method and apparatus is intended for building up a bed of material to the desired height and in a cross-sectional pattern of size arrangement which may be relatively uniform, as distinguished from heretofore proposed methods of charging such sintering machines in the form of multiple layers.

A method considered advantageous for some purposes is to build up the bed of material on the traveling grates of the sintering machine in a plurality of layers of material, each of successively increasing size or coarseness of pellets or particles in preparation for updraft sintering or burning.

The present method and apparatus are intended to form the bed of material to be sintered in a manner which may be described as gradually building the bed of material to the desired height by repeatedly distributing small increments onto a slope from the bottom or thinner portion to the full depth of the bed.

Various operational and effective sintering advantages are obtained by way of improvement over the former methods of feeding from a chute or chutes, material of different increasing coarseness, in an attempt to create a plurality of distinct layers, for example, four, eight, or more layers, comprising the bed of material.

Referring to the updraft method of sintering as an introduction to outlining the significant changes and improvements of the present invention, the following is a brief review of prior and proposed processes.

Updraft induration of balled charges is performed by igniting the fuel of carbon-coated green balls composed of fine material, burning the fuel, and transferring the heat of combustion to the pellet mass of the bed. This heat of the indurated pellet mass is transferred to another zone of a quiescent bed in order to effect drying, preheating, burning, and hardening, in what may be termed a "cyclical" manner, i.e., these steps occur preferably in the order mentioned.

This operation has been conducted by applying a predetermined or critical depth of bed of fuel-coated green balls on an incandescent bed of prefired pellets. Air forced upwardly through the incandescent bed initiates the heat hardening step or cycle. This incandescent zone may be referred to as a "combustion band" which progressively ascends through the bed of material to a second or upper layer of predetermined depth, which may be applied while an updraft stream of air is continued. This step or cycle may be repeated indefinitely or continuously.

The additional charge in predetermined arrangement is applied as a periodic finite layer, while the updraft is maintained continuously, which is necessary because of certain technical requirements or complexities.

Excessive depths of the bed, or too rapid applications of the bed layers cause consdensation of the moisture given off from the dried or drying pellets on the green, uppermost layers, with consequent saturation or "sogging" of the pellet mass, resulting in a relatively impervious, congealed cluster.

The arrangement and steps defined are illustrated as "prior art" in one of the figures of the accompanying drawings. In this illustration, a bed of material of previously fired pellets, for example, is drawn from a hopper by the movement of the grates, forming the thin bedding layer, and this is heated by a suspended furnace or suitable ignition means.

Next, a first stage of material is fed from a suitable conveyor and applied or laid upon this incandescent bed, and is simultaneously subjected to the forcible updraft of air. As the combustion band ascends through the first layer to a critical region, a second layer of material (or pellets) is applied by a second feeding means. This is repeated until four or more layers are built up.

Various disadvantages of the foregoing method have been encountered, as follows:

(1) Separate feeders are required for applying the separate layers, with a resultant increase in the number of feeding means.

(2) If all the feeders or feeding units conform, as is the practice, to a common elevation, the first and second, and subsequent feeders, drop the material a distance such as to result in severe impact to fragile green pellets.

(3) The tendency of roll or flow of the material results in undesirable segregation of pellets and small pellet fragments at all points of feeding of the material. This results in stratification of fragments and pellets, and, consequently, results in the formation of a relatively impervious bed having a concentration of fines in a defined layer. The upper or topmost of these relatively impervious layers, particularly of the pellet fragments, when subjected to the forcible updraft, gives rise to "blow holes," with the obvious, serious result of non-uniformity of combustion, draft flow, and irregular heat hardening.

(4) The impact of the soft green pellets occurring at each layer surface as they fall from each feeding means results in what may be termed "stratified" layers of compacted green pellets, further adding to the combustion difficulties such as mentioned in the foregoing paragraph.

(5) The most advantageous location of each delivery of the feeding means for a given rate of movement of the sintering grates requires alteration of position consequent upon changing of the speed and capacity of the traveling grate.

(6) Difficulties are encountered in attempting to deliver predetermined volumes from each mixing or pelletizing apparatus. This disadvantage becomes acute if attempts are made to alter the rate of movement of the sintering grates.

(7) Variations in delivery from the pelletizing disks to successive material discharge points may occur in such phase or order as to cause excessive depth of layers relative to the adjacent layers.

(8) The physical structure of charging feed conveyors seriously obstructs freedom of access to the traveling grate.

(9) Sudden heaping or surging of the material being fed, is difficult to avoid and results in non-uniform combustion.

(10) Uncoated fuel is frequently required to be added to the pellet charge in relatively coarse, uncoated form, and it is difficult to avoid segregation or excessive, non-uniform accumulation of it at a given zone, precluding uniform combustion.

(11) Updraft sintering machines include a hood or hoods over the traveling grates and a plurality of feed points for the material requiring apertures in the hoods, the number of which should obviously be kept at a minimum.

(12) The operation of the plurality of feeding devices is difficult to maintain in proper proportion, and this results in stratified layers, with a consequent over or under-fired product, and in certain zones or layers, consequent deleterious or unsatisfactory firing of subsequent layers.

The general object of the present invention is to overcome the foregoing enumerated disadvantages and to improve upon the functions to which they are related.

For convenience in the following description, I may refer to the present invention as a "mono-layer system" for building up deep charges of desired characteristics on the traveling grates. The present novel mono-layer method is performed by feeding the material with a conveyor, which is reciprocated along an inclined path while discharging uniformly from the bottom to the top of the bed to be formed. The feed is continuous while the conveyor is moved backwardly and forwardly along the inclined face of the charge being formed. The material is also uniformly spread transversely of the width of the sintering grates. By this method and apparatus I may apply these successive increments onto a relatively large area of the sloping face of the deep bed, and may continuously build and maintain a bed of the desired depth on the traveling grates.

This mono-layer system lends itself to the advantageous use of pelletizing apparatus, such as balling disks of the type shown, described and claimed in a pending patent application of McDowell, Ban and Gambon, Serial No. 565,639, filed February 15, 1956, for "Method and Apparatus for Making Pellets," or other types, such as shown in the application of McDowell and Gambon, Serial No. 568,628, filed February 29, 1956, for "Apparatus for Making Nodules or Pellets." Another such pelletizing and balling apparatus which may be used is shown in the application of Gambon and Rowen, Serial No. 569,919, filed March 6, 1956, for "Pelletizing Apparatus."

These pelletizing units may be most conveniently arranged to deliver to a common conveyor, which in turn delivers to my mono-layer material discharging device. Further, the pelletizing units may be closely arranged, and be controlled and observed by a single operator.

The present system permits conveniently adding a high ratio of coarse fuel near the top of the bed charge by intermittently discharging fuel in synchronization with the reciprocation of the material feeder when it is at its uppermost position of its sloping path.

An advantage thus attained is that the thickness and fuel content of this upper layer can be so precisely controlled as to lend itself to, and be compatible with, a process of producing novel fused mixes in the form of synthetic lump ore.

A further practical advantage is that the bed depth may be varied while maintaining its uniform nature by merely modifying the amplitude of movement of the reciprocating conveyor discharging the material.

The length of the reciprocating conveyor lends itself to providing a period of time of conveying the moving material, allowing for predrying or preheating of the pelletized mass prior to its discharge upon the grate bed.

In the accompanying drawings is somewhat diagrammatically illustrated the proposed prior multiple layer system, the disadvantages of which have been indicated above.

Similarly, other somewhat diagrammatic views illustrate the embodiment of apparatus for carrying out the present novel mono-layer system of building deep bed charges of desired and controlled consistency.

In the drawings:

Fig. 1 is a diagrammatic illustration of a sintering machine arranged for updraft firing or burning, in which the hood portion is omitted for simplification, and showing an arrangement of four material discharging means intended to create a four-layer bed on the traveling grates;

Fig. 2 is a diagrammatic plan view of the same indicating the feed to the discharging and distributing elements from a plurality of separate pelletizing and mixing means;

Fig. 5 is an enlarged vertical sectional view through a sintering machine hood and wind box, much of the structure, particularly in relation to the mixing and feeding supply, being diagrammatically shown;

Fig. 6 is a detail plan view on a still further enlarged scale showing a means for transversely distributing the material discharged from the sloping belt;

Fig. 7 is a diagrammatic view in the nature of a sectional profile showing a modification of the reciprocating and sloping belt.

Figure 3:
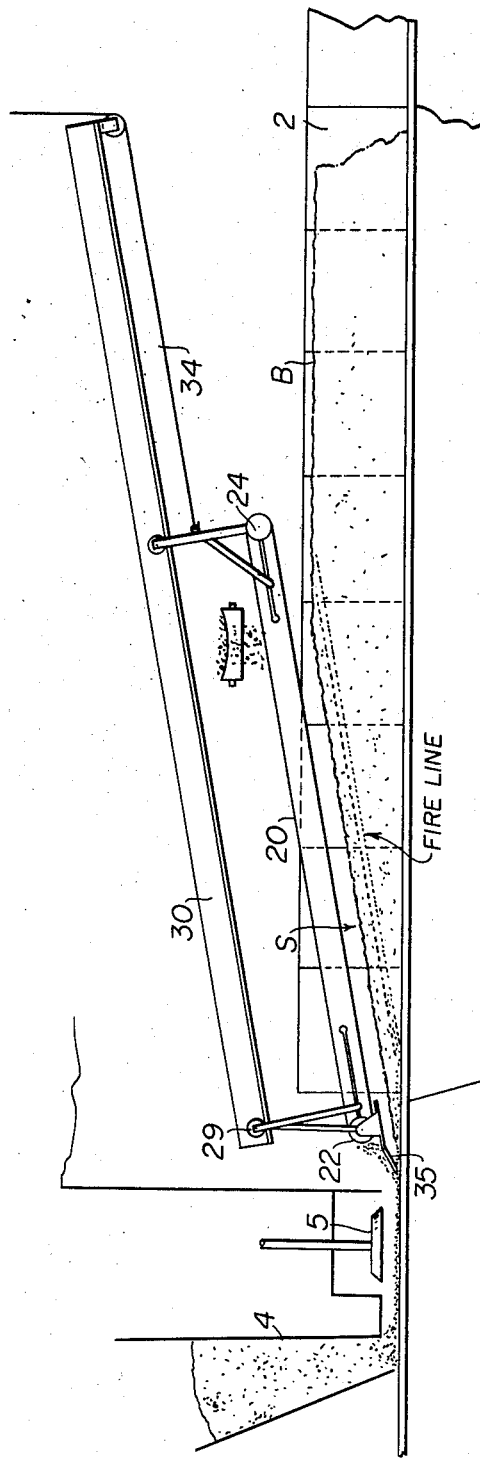
Fig. 3 is a diagrammatic view in the nature of a longitudinal section or profile showing the arrangement of a reciprocating sloping material delivering and feeding device for effecting the mono-layer charging of the present system.

The general arrangement of such a sintering machine with associated feeding belts arranged for delivering the material in a manner intended to produce uniform multiple layers, and which is shown in Figs. 1 and 2 may be referred to by way of further illustrating the problems and objections heretofore outlined.

That system included a conventional sintering machine known as the "Dwight-Lloyd" type, having a conveyor comprising a plurality of moving pallets and indicated on the drawing by the numeral 1, arranged to pass in a continuous path over sprockets 2 and 3, from left to right, on the upper reach. The line 1 may be assumed to represent the plane of the grates or material supporting means, as well as to diagrammatically indicate the path of the pallets. At 4 is indicated a chute for discharging combustible material in a thin layer onto the grates which pass under an igniting means, indicated at 5. A succession of feeding means, 6, 7, 8 and 9, illustrated as belts, discharge onto the moving conveyor depositing successive layers, of material, thus, building up the deep bed to be sintered, as indicated by the line L in the form of shallow steps.

A wind box or plurality of wind boxes extend along beneath the grates indicated by the line W for an updraft to support the combustion of the sintering operation. The hood, not shown in Figs. 1 and 2, may extend along the bed for a suitable distance. It is assumed that air supplied from fans or blowers as at F effects the updraft.

The belts 6, 7, 8 and 9 may be arranged to oscillate or travel from side to side to distribute material deposited thereon from conveyors such as belts 10, each carrying material from a mixer or pelletizer, such as indicated at 12.

The operation of such an arrangement and the physical difficulties embodied therein are those indicated in the numbered paragraphs preceding the foregoing objects stated herein.

The present novel system constituting an improvement over that method, and which may be adapted to the use of the same general type of sintering machine, will now be described.

As before, the conveyor includes the pallet grates 1 which are provided with side wall 2 to retain the bed of material to be sintered, indicated at B. A grate-covering bedding of previously fired pellets is fed from suitable hopper or chute 4 and ignited at 5.

Figure 4:
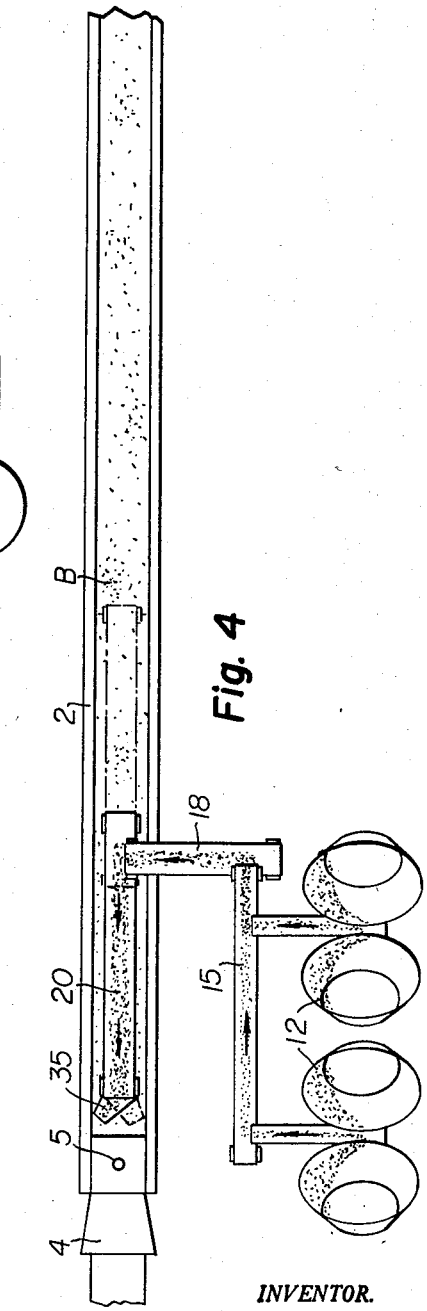
Fig. 4 is a diagrammatic plan view of the same on a reduced scale showing the relation of the pelletizing or mixing means and the feeding to the reciprocating sloping belt over the sintering grates.

A plurality of mixers or pelletizing devices 12 may be arranged to discharge upon a gathering belt 15, in turn discharging upon a single transverse belt 18. The belt 15 may be positioned to receive its material by passing under the discharge ends of conveyors 17, receiving the pellets, or mixed material, from the pelletizing devices 12, which, in Fig. 4, are illustrated as arranged in pairs.

At this point it may be indicated that for illustration it is preferred to use pelletizing apparatus of the balling disk type, such, for example, as the McDowell, Ban and Gambon application, Serial No. 565,639, above identified.

In the diagrammatic illustration of Fig. 3, the wind box below the grates is again indicated at W, and in this view a hood H is also illustrated as extending over the major portion of the bed of material to be sintered. The double line 1 diagrammatically illustrates the upper reach of the conveyor of the sintering machine, as above indicated, the pallets P with the grate portions and side walls forming the material-carrying conveyor. This arrangement appears more clearly in the somewhat diagrammatic cross sectional view of Fig. 5. Thus, it may be assumed that a transverse feeder belt or conveyor 18 extends through an opening in the side of the hood and discharges its material approximately at the mid line of a reciprocating conveyor belt 20 of my mono-layer material-distributing and deep-bed forming apparatus, which, as indicated above, is intended to distribute the material uniformly from the bottom incandescent fuel layer of combustible material C to the desired depth on a gradual slope indicated at S.

While creating the slope S of material and building up the bed to the full height by depositing the material along the slope, as thus created, the material is trimmed and evenly distributed from side to side.

This material delivering and trimming apparatus may comprise any of a number of devices so arranged as to create the uniform bed to the full depth by depositing it along such a gradual slope that its surface is at an angle substantially less than the angle of repose of the material.

It is important to note that if loose material or pellets be discharged from a stationary delivery point, the coarser material rolls down a steep slope, while the finer material, rolling less easily, remains at or near the top of a pile or layer. This occurs even while building the relatively thin plurality of layers by the previous method described and illustrated in Figs. 1 and 2.

Obviously, if a deep bed of two or three or more feet in depth is attempted to be built, and which bed is composed of particles and pellets of varying sizes, and which is delivered at a single transverse zone or point of delivery, the larger particles will roll to the foot of the slope. The face of the slope will be that of the angle of flow or roll of the material, and the upper portion of the bed will be composed principally of the fine material. Wherefore, it will be seen that the objections outlined in this connection will be encountered, and the sintering operation will be non-uniform and unsatisfactory.

As an illustrative means of distributing the material evenly over a gradual slope and to the full height of a deep bed, I may use a delivery belt indicated at 20 onto which the material is discharged from the collecting belt 18, and which is so mounted as to be continuously driven while it is longitudinally reciprocated to bring its discharge end from the forward or lower end of the slope S to the higher end of this gradual slope of material, and return. This movement is indicated by the double arrow in Fig. 3.

An illustrative structure for mounting the reciprocating belt may comprise two end pulley rollers 22 and 24, shown as supported by a suspended frame 23. Rollers 25 in the frame and within the belt are adapted to give it its concave transverse configuration. This belt and frame may be supported on a carrier comprising upwardly extending members 28 provided at their upper ends with rollers 29 embracing the flanges of an I-beam or like mono-rail track 30 positioned at the desired slope, whereby the sloping material-delivery belt may be moved longitudinally parallel with the slope on which the material is desired to be deposited, while the supply belt 18 remains stationary.

The means for driving the belt 20 on the frame 23 and for effecting the longitudinal travel along the supporting track may be any suitable mechanisms. As appears, a cable 34 may be attached to the frame 23 and extend outside of the hood to an operating mechanism, such as a reversing reel, not shown.

Referring particularly to Figs. 5 and 6, a distributing chute 35 is shown as merely illustrative of any of various methods of distributing the material transversely of the bed being formed between the side walls of the pallets P of the sintering machine.

The chute 35 may be pivoted as at 37 beneath the forward end of the carrier frame for the belt 20, and may have a pivotal connection at 38 to a plunger rod of a reciprocating means, such as an air cylinder 40, supplied by air through a flexible tube indicated at 42, and acting to swing the chute from side to side.

As is well understood, the movement of the pallets carrying the mono-layer bed of material to be sintered is very slow, being from one to a few feet a minute. The period or rate of reciprocation of the sloping belt 20 may be as frequent as desired to effect the building of the full depth of the bed, over the slope along which the material is laid, corresponding to a given distance of grate travel. The side to side oscillation of the distributor, such as the chute, may occur many times for each upward and downward movement of the reciprocating belt and frame.

The distribution and depositing of the material on the slope may be thus made to conform to the most desirable conditions, including the angle of the slope, the depth of the bed; speed of movement of the grates, and the amount of material to be deposited at a given time.

It will be recognized that if the feed to the belt 20 is substantially continuous and uniform, and if the surface speed of the belt 20 were uniform, the amount of material distributed over the slope of the bed, during an up-stroke of the belt 20, would differ somewhat from the amount deposited as it moves down the incline. However, the number of reciprocations with relation to the depth of the bed and rate of movement may be governed to suit conditions so that the difference in the amount deposited during an up-stroke of the belt 20 from that of the amount deposited during the down-stroke may become of no practical moment, for the reason that the material is so very thinly and evenly distributed on either the up or down stroke.

It is contemplated that for certain conditions, it may be desirable to vary the surface speed of the belt 20 with relation to its reciprocating movement on both up and down strokes so that the material may be uniformly discharged over the slope on both strokes.

In addition to the factor of sloping the surface of the bed being formed along the zone of discharge at an angle substantially below the normal angle of repose of the loose material, whether particles or pellets, the rate of firing also has a relation to the desired or most efficient angle of slope of deposited material forming the bed, and thus of the sloping path of the reciprocating feeder belt.

As is understood, in such burning and sintering operations, there is a relatively thin zone of combustion moving from the ignited grate covering of pellets or fuel and rising to the top of the composite bed, as the grates progress. This may be referred to as the "fire line," and is indicated by the parallel lines extending along beneath the slope S and bearing the legend "fire line."

In other words, the angle of inclination or the profile of the slope of the bed and slope of the reciprocating conveyor is determined by the rate of ascension of the firing zone (in updraft) and the rate of the traveling grate movement.

It is understood that in the case of downdraft operation of such a machine, where, as before, it is desirable to have a bed of uniform distribution of particle sizes throughout, the firing zone would be traveling downwardly, and thus the slope along which the bed is formed might be determined by the nature of the material.

The reciprocating feeder may be arranged to move out of and into the hood by arranging the roof of the hood more closely to the top of the bed and by making an offset portion.

If desired, a protective casing in the form of an elongated trough enclosing the bottom and sides of the belt 20 and its carrier frame may be provided to protect it from heat. The pulleys on which the belt 20 rolls may also be cooled by circulating water through them in a well-known fashion.

Various modifications may be made in the mechanical embodiment of the apparatus for carrying out my system and for adapting to different forms of sintering apparatus and to the treatment of different materials, and also to the use of down-draft as well as up-draft burning.

In respect to the foregoing objects of the present invention, twelve disadvantages of a so-called multi-layer system of making or forming a bed of material are enumerated. The present system overcomes these disadvantages, and for convenience, the corresponding advantages are enumerated in respective order as follows:

(1) The single feeding unit would be less expensive to install, maintain and operate.

(2) A uniform low height of discharge from the feeder to the bed is constantly maintained.

(3) Pile segregation of sizes is minimized or overcome, providing a bed of uniform porosity.

(4) Impaction of surface pellets is uniform throughout the pellet bed providing uniform bed porosity.

(5) Optimum distributed feed commensurate with combustion rates and grate speed is readily attained.

(6) If production rates from the different balling disks change, the entire feed is composited or totalized from one feed point and the charge application becomes uniform.

(7) Surges of quantity of balling disk production are evened or absorbed in the grate area of feed application.

(8) A single feed conveyor provides greater accessibility and more working area around the traveling grate.

(9) The uniform material distribution is more conducive to uniform combustion.

(10) Segregation of coarse uncoated fuel is minimized or overcome by the present novel feeding method.

(11) Only a single opening in the hood is needed for the feed, thus reducing the area for fume leakage and air infiltration.

(12) Faulty fuel proportioning in any balling disk line does not affect any zone of the bed because of improved bed blending throughout.

In addition to overcoming the enumerated disadvantages of the proposed former multi-layer applications, the mono-layer application system has several additional advantages as follows:

A. The balling disk layout can be conveniently arranged to provide a common collecting conveyor under several balling disks. This provides a less expensive layout and one man may operate several balling disks.

B. High ratios of coarse fuel applications near the top of the bed charge can be attained by separately spreading fuel at the uppermost part of the bed, by applying fuel on the reciprocating feeder in synchronization with the uppermost part of feed delivery, or by using a separate feeder-distributor for fuel application near that of the bed. The thickness of such a partial zone of the bed can be readily controlled and altered. This allows the mono-layer application to be compatible with a system of producing fused masses as a synthetic lump ore.

C. Increasing total bed depths can be accomplished without the use of additional feeders, by simply increasing the amplitude of the sloping belt conveyor reciprocation.

D. The residence period of a charge on the long reciprocating conveyor in the hood of the traveling grate is a factor in predrying or heating of the pelletized mass prior to its delivery to and application on the hearth bed.

Referring to Fig. 7, a somewhat modified form illustrates an arrangement in which the reciprocating sloping material-distributing belt may have a portion extending upwardly outside of the hood.

In this arrangement the forward belt roller pulley 22 for the belt 20a is carried on a frame, in turn supported by a sloping rail 30, as before, the frame also carrying the material spreader, such as the chute 35.

At 50 and 51 are shown rollers from which the upper and lower reaches of the belt turn out of the hood H and pass over a roller pulley 53 which may be arranged to move upwardly and downwardly as the frame and roller pulley 22 move upwardly and downwardly along the sloping path of discharge. As indicated, the roller 53 may be carried by a support 55, which in turn may be counter-balanced by a weight indicated at 56 on a cable passing over a drum 57.

This belt 20a obviously must be long enough to extend upwardly an amount to compensate for the full reciprocating movement desired, and thus, it will be cooled somewhat. The nature of the belt may make this desirable.

The roller 53 may be power-driven by a suitable motor indicated at 58, carried by the support 55, and which in turn may have its speed altered at intervals to compensate for the feed delivery and discharge on the downward, forward and upward strokes of the belt 20a. The drum 57 also may be driven in its alternately reversing action at varying speeds related to the delivery of the material from the belt, as by a motor 59.

From the foregoing description it will be seen that the system described and illustrated accomplishes the objects set forth, and that it is capable of adaptation to a wide range of requirements.

Having thus described my invention, what I claim is:

1. A method of charging a sintering machine with a deep bed comprising finely divided material mixed and formed into components of varying sizes of pellets and loose particles, the method consisting of mixing the material and maintaining uniform composite distributed relation of the components while conveying the material to moving pallets and spreading it from side to side and upwardly and downwardly in multiplicity of repeated applications of the material and along a gradual slope corresponding to the angle of travel of a thin firing zone created by igniting the material at the bottom of the bed and causing the firing zone to move progressively upwardly.

2. The method of charging and firing a deep bed of material on a succession of moving pallets of a sintering machine, comprising igniting a thin grate-bed of material, mixing and pelletizing finely divided material to be sintered, gathering said material while maintaining a uniform distributed mutual relation of small and large pellets, moving the material along a slope and delivering it in small quantity applications in a multiplicity of movements upwardly and downwardly to form a gradual slope of material extending from an incandescent grate covering to the top of the deep composite bed, while maintaining a uniform distribution in the deep bed and applying updraft to the bed to cause a firing zone to progessively move upwardly substantially parallel to the slope to which the material has been delivered.

3. An apparatus for charging the moving grates of a sintering machine, with a deep bed formed of components of varying sizes of pellets, including means for forming the pellets, means for gathering and delivering them to the sintering machine including a conveyor, means for mounting the conveyor on a gradual slope, and means for reciprocating the conveyor from the beginning of the pile at the bottom of the slope to the top of the deep bed and effecting a plurality of reciprocations and applications at a rate of delivery sufficient to continuously form a deep bed of uniformly composite large and small pellets and particle components.

4. The apparatus defined in claim 3 in which the material-delivery means comprises a conveyor belt, an oscillating means for moving the forward end of the belt along a slope while delivering the material therefrom to form a slope corresponding to the slope of movement of said traveling conveyor.

5. The device defined in claim 3 including a reciprocating traveling conveyor, means for supporting and reciprocating the same longitudinally along the slope of material to be formed at the beginning of the bed and extending from the bottom to the top thereof, an oscillating distributing means carried at the delivery end of said traveling conveyor, and means for oscillating the same to distribute the material from side to side.

6. An apparatus for charging material onto the moving pallets of a sintering machine comprising a plurality of pelletizing units, a common conveyor receiving pellets from said units, a traveling conveyor extending longitudinally of and over the pallets of the sintering machine, means supporting said conveyor and means for reciprocating said support and the conveyor on a sloping path to deposit the material uniformly on a sloping bed-surface, the angle of said sloping path being such that the components delivered from the pelletizing units are prevented from rolling on said surface, and means for timing the reciprocating means to effect a plurality of continuous thin applications of material having uniform composite distribution of the various size pellets.

References Cited in the file of this patent
UNITED STATES PATENTS

| | | |
|---|---|---|
| 2,750,274 | Lellep | June 12, 1956 |
| 2,821,469 | Davis | Jan. 28, 1958 |